United States Patent [19]
Nozaki et al.

[11] Patent Number: 5,703,900
[45] Date of Patent: Dec. 30, 1997

[54] LASER-DIODE-PUMPED SOLID STATE LASER AND METHOD OF MANUFACTURING THE SAME

[75] Inventors: Nobuharu Nozaki; Shinji Mitsumoto; Kazumi Kubo, all of Kanagawa-ken; Fumio Kobayashi, Saitama-ken, all of Japan

[73] Assignees: Fuji Photo Film Co., Ltd., Kanagawa; Fuji Photo Optical Co., Ltd., Saitama-ken, both of Japan

[21] Appl. No.: 580,183

[22] Filed: Dec. 28, 1995

[30] Foreign Application Priority Data

Dec. 28, 1994 [JP] Japan .................................. 6-327791

[51] Int. Cl.[6] .................................................. H01S 3/08
[52] U.S. Cl. .............................................. 372/107; 372/99
[58] Field of Search ............................... 372/6, 70, 71, 372/72, 75, 92, 95, 98, 99, 107, 18

[56] References Cited

U.S. PATENT DOCUMENTS

| | | | |
|---|---|---|---|
| 4,847,851 | 7/1989 | Dixon | 372/75 |
| 4,930,131 | 5/1990 | Sizer, II | 372/18 |
| 4,998,256 | 3/1991 | Ohshima et al. | 372/92 X |
| 5,289,552 | 2/1994 | Miller et al. | 385/73 |
| 5,502,738 | 3/1996 | Hyuga | 372/92 X |

*Primary Examiner*—John D. Lee
*Attorney, Agent, or Firm*—Sughrue, Mion, Zinn, Macpeak & Seas, PLLC

[57] ABSTRACT

A laser-diode-pumped solid state laser includes a Fabry-Perot resonator having a pair of resonator mirrors. A holder provided with a pair of mirror mounting faces spaced from each other in the direction of the optical axis of the resonator is prepared and the resonator mirrors are mounted by bonding the end face thereof, which intersects the optical axis of the resonator, to the mirror mounting faces of the holder by an adhesive layer. The thickness of the adhesive layer is not larger than 5μ.

3 Claims, 1 Drawing Sheet

LASER-DIODE-PUMPED SOLID STATE LASER AND METHOD OF MANUFACTURING THE SAME

BACKGROUND OF THE INVENTION

1. Field of the Invention

This invention relates to a laser-diode-pumped solid state laser in which a solid state laser crystal is pumped by a laser diode (semiconductor laser), and more particularly to such a laser-diode-pumped solid state laser having an improved resonator mirror mounting structure. This invention further relates to a method of manufacturing a laser-diode-pumped solid state laser having the improved resonator mirror mounting structure.

2. Description of the Related Art

There has been known a laser-diode-pumped solid state laser in which a solid state laser crystal doped with a rare earth element such as neodymium is pumped by a light beam produced by a laser diode. In such a laser, a Fabry-Perot resonator comprising a pair of resonator mirrors is generally employed as a resonator.

In the Fabry-Perot resonator, in order to keep stable the laser oscillation, it is necessary to prevent the resonator length (the distance between the surfaces of the resonator mirrors) from largely changing with the ambient temperature, for instance, by controlling the temperature of the resonator. When the resonator length changes largely, the laser output and/or the longitudinal mode fluctuated or noise is made. More particularly, the change in the resonator length should be not larger than ¼ of the oscillation wavelength. Since the oscillation wavelength of laser-diode-pumped solid state laser is typically 1 μm or so, the change in the resonator length should be not larger than 0.25 μm.

As a method of fixing the resonator mirrors in a predetermined position, it may be employed a method in which a holder having a pair of mirror mounting faces spaced from each other in the optical axis of the resonator is prepared and each resonator mirror is mounted by bonding the end face thereof, which intersects the optical axis of the resonator, to the mirror mounting face of the holder.

However this approach makes it difficult to suppress the change in the resonator length within the above identified range. That is, adhesive of polymer or the like is not perfectly cured but shrinkage on curing sometimes progresses by aging or during storage at an elevated temperature. Further the thickness of the adhesive layer can change due to stress caused by difference in linear expansion coefficient between the resonator mirror and the holder during storage at low or high temperature. Even if the laser is operated at a controlled temperature, change in the degree of cure or thickness of the adhesive layer due to stress can occur when power supply to the laser is cut for interruption of operation or transfer of the laser, which results in change in resonator length with time.

SUMMARY OF THE INVENTION

In view of the foregoing observations and description, the primary object of the present invention is to provide a laser-diode-pumped solid state laser in which a pair of resonator mirrors are bonded to mirror mounting surfaces of a holder without fear that the length of the resonator largely changes with the ambient temperature.

Another object of the present invention is to provide a method of manufacturing a laser-diode-pumped solid state laser in which a pair of resonator mirrors are bonded to mirror mounting surfaces of a holder without fear that the length of the resonator largely changes with the ambient temperature.

In accordance with a first aspect of the present invention, there is provided a laser-diode-pumped solid state laser comprising a Fabry-Perot resonator having a pair of resonator mirrors wherein the improvement comprises that a holder is provided with a pair of mirror mounting faces spaced from each other in the direction of the optical axis of the resonator, the resonator mirrors are mounted by bonding the end face thereof, which intersects the optical axis of the resonator, to the mirror mounting faces of the holder by an adhesive layer, and the thickness of the adhesive layer is not larger than 5μ.

Preferably the mirror mounting surfaces are not larger than the oscillation wavelength of the laser in surface roughness.

In accordance with another aspect of the present invention, there is provided a method of manufacturing a laser-diode-pumped solid state laser in which when an optical part which governs the length of the resonator of the laser-diode-pumped solid state laser is bonded to a part mounting surface of a holder which intersects the optical axis of the resonator, the optical part is brought into a close contact with the part mounting surface and then adhesive is impregnated into between the optical part and the part mounting surface.

In accordance with our investigation, typical adhesives employed in bonding a resonator mirror, e.g., two-part room temperature curing epoxy adhesive or room temperature vulcanizing silicone rubber adhesive, are about 2% in cure shrinkage (linear shrinkage). Accordingly, when the thickness of the adhesive layer on the mirror mounting surface is not larger than 5 μm, the shrinkage is about 0.1 μm (5×0.02) even if cure shrinkage of the uncured part of the adhesive layer progresses. Thus the total shrinkage of the adhesive layers for the two resonator mirrors (i.e., the change with time of the resonator length) is about 0.2 μm, which is not larger than 0.25 μm described above.

Accordingly, the change with time of the resonator length does not exceed ¼ of the oscillation wavelength (around 1 μm), whereby the laser output and/or the longitudinal mode can be kept stable and production of noise can be prevented.

When the mirror mounting surfaces are not larger than the oscillation wavelength of the laser in surface roughness, the adhesive spreads wide uniformly and the adhesive layer can be smaller in thickness, whereby change in the resonator length can be smaller.

In accordance with the method described above, the thickness of the adhesive layer can be easily controlled to be not larger than 5 μm. That is, when the resonator mirror is brought into a close contact with the mirror mounting surface and then adhesive is impregnated between the mirror and the mirror mounting surface, the adhesive spreads extremely thin.

This method may be employed to bond optical parts other than the resonator mirror which governs the resonator length to a part mounting surface which intersects the optical axis of the resonator in order to make the adhesive layer very thin and to suppress the change in resonator length due to change in the degree of cure or thickness of the adhesive layer due to stress.

DESCRIPTION OF THE PREFERRED EMBODIMENT

Figure 1:
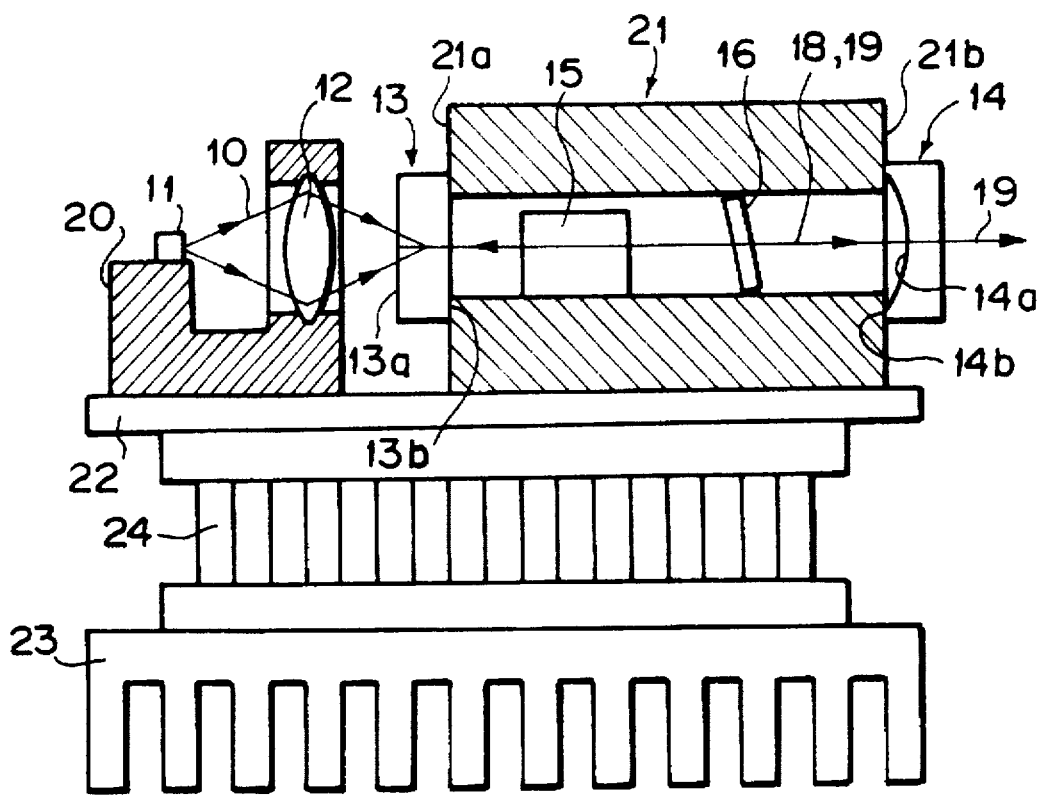
FIG. 1 is a schematic side view showing a laser-diode-pumped solid state laser in accordance with an embodiment of the present invention.

In FIG. 1, a laser-diode-pumped solid state laser in accordance with an embodiment of the present invention comprises a semiconductor laser 11 (in the form of a chip) which produces a laser beam 10 as a pumping beam, a condenser lens 12 which condenses the laser beam 10, which is produced as divergent light, a YAG crystal 13 which is a solid laser medium doped with neodymium (Nd) (will be referred to as "Nd:YAG crystal 13", hereinbelow), and a resonator mirror 14 disposed forward (the right side as seen in FIG. 1) of the Nd:YAG crystal 13.

A KNbO₃ crystal 15, which is a nonlinear optical material, and an etalon 16 in the form of a quartz plate are disposed between the resonator mirror 14 and the Nd:YAG crystal 13 in this order from the Nd:YAG crystal side.

The semiconductor laser 11 produces a laser beam 10 having a wavelength of 809 nm. Neodymium ions in the Nd:YAG crystal 13 are stimulated by the laser beam 10 and the Nd:YAG crystal 13 thereby produces a laser beam having a wavelength of 946 nm. The pumping light incident side end face 13a of the Nd:YAG crystal 13 is provided with a coating which is highly reflecting (a reflectivity of not lower than 99.9%) at 946 nm and antireflecting (a transmittance of not lower than 99%) at 809 nm (the wavelength of pumping leaser beam). The resonator mirror 14 is of quartz and the mirror surface 14a thereof is provided with a coating which is highly reflecting at 946 nm and antireflecting at 473 nm (the wavelength of second harmonic to be described later).

Thus the light beam of a wavelength of 946 nm is confined between the surfaces 13a and 14a and oscillates. The laser beam 18 thus produced impinges upon the KNbO₃ crystal 15 and is converted into its second harmonic 19 having a wavelength of 473 nm equal to a half of the wavelength of the laser beam 18. The second harmonic 19 is output from the resonator mirror 14.

The semiconductor laser 11 and the condenser lens 12 are fixed to a first holder 20, and the Nd:YAG crystal 13, the KNbO₃ crystal 15, the etalon 16 and the resonator mirror 14 are fixed to a second holder 21. The holders 20 and 21 are fixed to a base plate 22 which is fixedly mounted on a Peltier element 24 connected to a heat sink 23.

In this embodiment, the Nd:YAG crystal 13 and the resonator mirror 14 form a Fabry-Perot resonator, and the resonator, the semiconductor laser 11 and the condenser lens 12 are kept at a predetermined temperature by the Peltier element 24 driven by a temperature control circuit not shown.

The second holder 21 is, for instance, of copper and is substantially a rectangular tube in shape. The opposite end faces of the second holder 21 are ground to mirror mounting surfaces 21a and 21b extending perpendicular to the optical axis of the resonator. The Nd:YAG crystal 13, which also functions as a resonator mirror, is fixed to the second holder 21 by bonding a light-transmissive surface 13b to the mirror mounting surface 21a. The resonator mirror 14 is fixed to the second holder 21 by bonding the peripheral surface 14b outside the mirror surface 14a to the mirror mounting surface 21b. The KNbO₃ crystal 15 and the etalon 16 are fixed in the trough hole of the holder 21 extending the direction of optical axis of the resonator by boding them to the inner peripheral surface of the holder 21. For example, two-part room temperature curing epoxy adhesive may be used.

The mirror mounting surfaces 21a and 21b are mirror-finished so that their surface roughnesses are smaller than the oscillation wavelength of the solid state laser, 946 nm. Superfine cutting finish may be employed in place of mirror finish. The bonding surface 13b of the Nd:YAG crystal 13 and the bonding surface 14b of the resonator mirror 14 which are bonded to the mirror mounting surfaces 21a and 21b are also finished to have surface roughnesses of smaller than the oscillation wavelength of the solid state laser and to extend perpendicular to the optical axis of the resonator.

Figure 2:
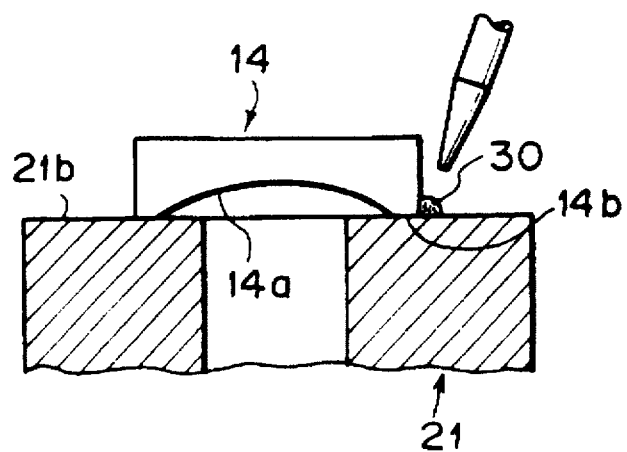
FIG. 2 is a view for illustrating the method of bonding the resonator mirror.

As shown in FIG. 2, the resonator mirror 14 is fixed to the holder 21 by bringing the bonding surface 14b into a close contact with the mirror mounting surface 21b of the holder 21 and then dropping adhesive 30 to impregnate it between the surfaces 14b and 21b. Similarly the Nd:YAG crystal 13 is fixed to the holder 21 by bringing the bonding surface 13b into a close contact with the mirror mounting surface 21a of the holder 21 and then dropping adhesive 30 to impregnate it between the surfaces 13b and 21a. After impregnating adhesive between the bonding surfaces, the adhesive was caused to stand still for 24 hours at a room temperature and then baked at 80° C. for 12 hours.

After the baking, the thicknesses of the adhesive layers between the mirror mounting surface 21a and the Nd:YAG crystal 13 and between the mirror mounting surface 21b and the resonator mirror 14 were about 1 to 2 μm. This satisfies the aforesaid requirement of not thicker than 5 μm. The adhesive was 5 to 6% in volume cure shrinkage and was subjected a preservation test at −25° C. to 70° C. The change in the thicknesses of the adhesive layers were not larger than 0.1 μm.

Accordingly, the change in the resonator length (the distance between the end face 13a of the Nd:YAG crystal 13 and the mirror surface 14a of the resonator mirror 14) due to the change in the thicknesses of the adhesive layers is not larger than 0.2 μm. This value is not larger than ¼ of the oscillation wavelength of the solid state laser, 946 nm. Accordingly, the laser output and/or the longitudinal mode can be surely kept stable and production of noise can be surely prevented. In this embodiment, fluctuation in oscillation wavelength was not larger than 0.01 nm.

Control

In order to prove the effect of the present invention, a control laser-diode-pumped solid state laser was prepared in the same manner as in the embodiment described above except that the mirror mounting surfaces 21a and 21b of the holder 21 were finished by milling. In this control, the thicknesses of the adhesive layers between the mirror mounting surface 21a and the Nd:YAG crystal 13 and between the mirror mounting surface 21b and the resonator mirror 14 after baking were about 10μ larger 5 μm. After a preservation test at −25° C. to 70° C., the change in the thicknesses of the adhesive layers were not larger than 0.2 μm.

Accordingly, the change in the resonator length due to the change in the thicknesses of the adhesive layers is about 0.4μ and exceeds ¼ of the oscillation wavelength of the solid state laser, 946 nm.

Though an embodiment of the present invention in which Nd:YAG crystal is employed as a solid laser crystal and the solid state laser beam is converted to its second harmonic is described above, the present invention can be applied to various laser-diode-pumped solid state lasers employing other solid laser crystals and those in which wavelength conversion is not involved.

What is claimed is:

1. A laser-diode-pumped solid state laser comprising a Fabry-Perot resonator having a pair of resonator mirrors wherein the improvement comprises that a holder is provided with a pair of mirror mounting faces spaced from each other in the direction of the optical axis of the resonator, the resonator mirrors are mounted by bonding the end face thereof, which intersects the optical axis of the resonator, to the mirror mounting faces of the holder by an adhesive layer, and the thickness of the adhesive layer is not larger than 5μ.

2. A laser-diode-pumped solid state laser as defined in claim 1 in which the mirror mounting face D are not larger than the oscillation wavelength of the laser in surface roughness.

3. A method of manufacturing a laser-diode-pumped solid state laser in which when an optical part which governs the length of the resonator of the laser-diode-pumped solid state laser is bonded to a part mounting surface of a holder which intersects the optical axis of the resonator, the optical part is brought into a close contact with the part mounting surface and then adhesive is impregnated between the optical part and the part mounting surface.

* * * * *